J. NELSON.
MANUFACTURE OF CARBON FOR PIGMENTAL AND OTHER PURPOSES.
APPLICATION FILED MAY 7, 1921.
1,414,482. Patented May 2, 1922.
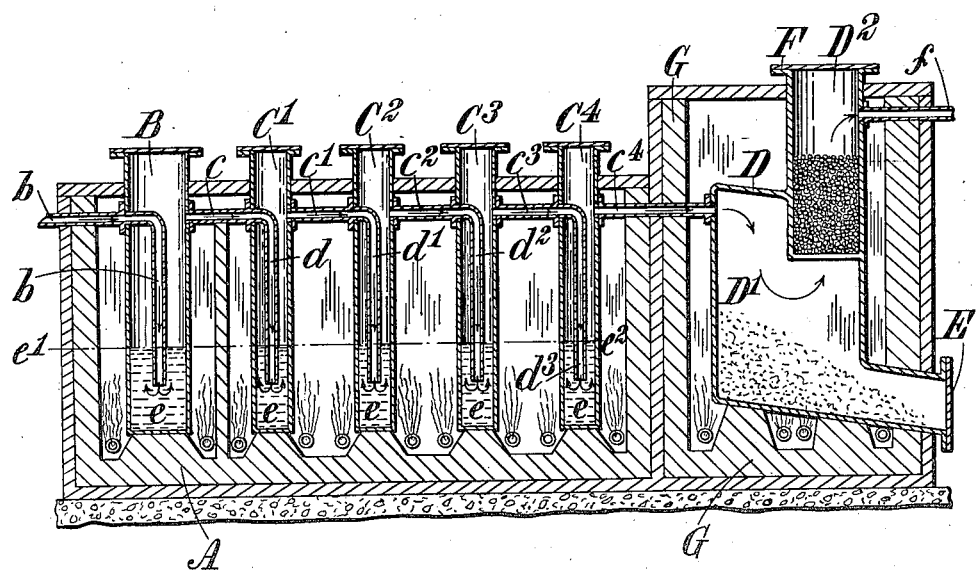
Inventor
John Nelson
by Bakewell, Byrnes & Parmelee
his Attorneys.

UNITED STATES PATENT OFFICE.

JOHN NELSON, OF GLASGOW, SCOTLAND.

MANUFACTURE OF CARBON FOR PIGMENTAL AND OTHER PURPOSES.

1,414,482.   Specification of Letters Patent.   Patented May 2, 1922.

Application filed May 7, 1921. Serial No. 467,670.

*To all whom it may concern:*

Be it known that I, JOHN NELSON, a subject of the King of England, residing in Glasgow, Scotland, Great Britain, have invented certain new and useful Improvements in the Manufacture of Carbon for Pigmental and Other Purposes, of which the following is a specification.

This invention relates to the production of carbon of the type of carbon black and lampblack, suitable for the preparation of pigments and other purposes, and has for its object the manufacture of such carbon in a soft, amorphous, very voluminous form, substantially free from oily or tarry impurities.

Ordinary lampblack is usually prepared by the combustion of oils, resinous matters, hydrocarbon gases, or like substances which are capable of burning with the production of much smoke, burning being effected with a supply of oxygen insufficient for complete combustion. The sooty matter produced is collected and constitutes lampblack. By reason of its mode of production, lampblack is necessarily exposed to a very high temperature, viz, the temperature of the flame in which the carbon is liberated. The product is also liable to be,—and is, generally,—contaminated with oily or empyreumatic matters derived from imperfectly decomposed vapours, and the presence of such impurities impairs the value of the carbon. Various modified methods have, consequently, been proposed for the purpose of preparing carbon of this type.

The object of the present invention is to provide a process whereby carbon substantially free from oily or empyreumatic matters may be obtained from sources ordinarily giving rise to carbons contaminated with such impurities. Such substantially pure carbon is hereinafter referred to as refined lampblack.

According to the present invention, a process for the manufacture of refined lampblack by the thermal decomposition in the absence of air of hydrocarbon oils or gases which give rise under such conditions to volatile oily or empyreumatic decomposition products, is characterized by collecting the finely divided liberated carbon outside the sphere of decomposition at a temperature sufficiently high to prevent deposition upon the carbon of condensable impurities of this kind.

The gaseous products of decomposition carrying the finely-divided carbon may be led into a closed chamber maintained at a temperature high enough to prevent condensation upon the deposited carbon of any oily or tarry matters from the vapours.

The invention may be advantageously applied to the recovery of refined lampblack from the vapours derived from the "cracking" of hydrocarbon oils, for example, the vapours evolved in the cracking of such oil according to the process set forth in the specification of British Letters Patent, No. 116,304, and the present invention may be conveniently exemplified in its application to the preparation of finely-divided carbon from this source.

In preparing carbon from the vapours of cracked oils it is preferred to conduct the cracking at a temperature substantially between 500° C. and 700° C.

Before exposure to the atmosphere the carbon produced must be cooled to a temperature at which ignition will not take place, and such cooling must be effected in the absence of condensable oily or tarry vapours. According to one preferred mode of procedure, this is accomplished by passing a current of a suitable non-condensable gas, which may be produced in the process, over the hot carbon in order to sweep away associated condensable impurities.

The temperature for producing the carbon will naturally depend upon the nature of the particular oil or gas employed. Any suitable device for collecting the carbon may be employed, provided that the temperature can be maintained sufficiently high to prevent condensation of oily or tarry matters upon the carbon. The collecting chamber must always be at the requisite temperature and therefore means should be provided for the preliminary heating of the chamber in order to avoid condensation of the objectional impurities when the hot gases carrying the finely-divided carbon are introduced in the beginning of the process.

The accompanying drawing shows diagrammatically in vertical longitudinal section one form of apparatus suitable for carrying the present invention into effect. This apparatus consists of a combined cracking plant and carbon collecting chamber, the cracking plant shown being one modification of that described in the specification of British Letters Patent, No. 116,304.

Referring to the drawing—A is a furnace within which are disposed a retort B and four cracking-pots $C_1$, $C_2$, $C_3$, $C_4$. The retort B has an inlet, $b$, for oil, and an outlet $c$, for vapour communicating with the vapour-inlet $d$, to the first cracking-pot $C_1$. Similar vapour outlets, $c_1$, $c_2$, and vapour-inlets, $d_1$, $d_2$, provide communication through the succeeding cracking-pots. The retort and the cracking-pots contain a fusible contact material $e$, for example, lead, the level of which is indicated by the line $e_1$—$e_2$, the oil inlet pipe $b$, and the vapour-inlets $d$, $d_1$, $d_2$, $d_3$, dipping into the contact-material to a depth of about three inches in each case. The vapour-outlet, $c_4$, from the cracking pot, $C_4$, leads to a carbon collecting chamber D.

The chamber D, may be of any suitable shape. As shown in the drawing, it consists of a main chamber $D_1$ into which the vapour-outlet $c_4$ leads, and an upper narrower portion $D_2$ with a vapour-outlet $f$. This portion, $D_2$, may be provided with any desired filtering-device or medium, such as coke, or charcoal, pumice or steel-wool which may be carried upon one or more iron plates or grids. The main chamber $D_1$ is provided with a manhole, closed with a door, E, for access to the interior and removal of the carbon, and a second manhole, with cover, F, enables the filtering material to be introduced or removed. The chamber, D, is set in a furnace G, which is heated independently of the furnace A.

The operation of this apparatus is as follows:—Oil is led into the retort B through the inlet pipe $b$ and is carried down into the molten contact material $e$, which is maintained at a temperature sufficient to effect continuous vaporization at the desired rate of feed of the oil. The oil is vaporized and the vapours pass through the vapour-outlet $c$ and vapour-inlet $d$ into the contact material in $C_1$ through which they bubble, and so on through the molten mass in the three succeeding pots. The temperature of the contact-substance depends upon the nature of the oil used, but under no circumstances must the temperature be so low as to admit of any condensation either in the pots $C_1$, $C_2$, etc., or in the communicating conduits. This is of particular importance in the case of the fourth pot, $C_4$, as it is essential that the products therefrom should enter the carbon depositing chamber D in the form of vapour free from condensed or partially condensed products.

Prior to starting the oil feed to the retort B, the chamber D is heated up to such a temperature that the vapours introduced will not condense, and as a general guide it may be said that the temperature in this chamber should not be less than 400° C., this provision applying also to the filtering media in $D_2$. The chamber may be heated externally, for example, by means of the hot combustion gases from the furnace employed in decomposing the oil or gas.

It is preferred to keep the temperature within the cracking pots in the neighbourhood of 600° C. but it will be appreciated that the actual temperature employed must be determined by the circumstances in any given instance, and in certain cases excellent results have been obtained at considerably higher temperatures than this. As a general rule in commercial practice it will be found that in order to avoid the accumulation of hard carbon in the cracking-pots the temperature therein should not be less than 500° C. or greater than 700° C, whilst the chamber D should be so heated as to subject the incoming vapours to as sudden a fall in temperature as possible.

The carbon collected in chamber D must, before exposure to the atmosphere, be cooled to a temperature below the ignition-point. This may be effected by allowing the chamber to cool down, or, more expeditiously, by passing a current of a suitable non-condensable gas, such as the non-condensable oil-gas produced in the process, over the carbon, the said gas being led away either through the outlet $f$, or the gas may be forced in under pressure and effect the removal of the carbon through a special outlet connected to a jacketed conduit leading to a carbon storage house.

The following example, given for purposes of illustration, will serve to indicate how the present invention may be carried into effect by the aid of this apparatus:—

A crude hydrocarbon oil of specific gravity of 0.975 was fed at the rate of about 7.5 gallons per hour through the retort B and cracking-pots $C_1$, $C_2$, $C_3$, $C_4$, the contact-material being molten lead and the average temperature within the pots about 613° C. The vapours issuing from the outlet $c_4$ were passed into the chamber D, which was heated to a temperature of 410° C., wherein the carbon was deposited, any carbon not thrown down in $D_1$ being caught by the filter $D_2$ composed of layers of coke, the uncondensed vapours being led away through the outlet $f$. The carbon so collected had an apparent specific gravity of about 0.10–0.16, constituting a powder lighter than high quality carbon black obtained from natural gas. The yield amounted to 6.8 per cent, of the weight of oil cracked.

It will be appreciated that the invention is not restricted to the use of any given apparatus, and that the above mode of operation, which has been given by way of example, may be varied according to circumstances without departing from the spirit of the invention. Two or more carbon collecting chambers may be interposed between two or more of the cracking-pots so as to increase, according to the number of the latter, the percentage of refined carbon continuously collected. Any known methods for facilitating the deposition of the carbon in the carbon collecting chamber may be utilized as required.

The vapours issuing from the vapour outlet $f$, or from the corresponding outlet from the last of such chambers if a series be used, may be led to a condenser and the uncondensable vapours may be employed for heating the plant.

The invention may be applied to other cracking or retorting processes which result in the thermal decomposition of hydrocarbon oils or gases in the absence of air with production of finely-divided carbon and vapours condensable to oily or tarry bodies, and it will be understood that the invention is operable whether or not the products other than carbon be collected or utilized.

What I claim as my invention and desire to secure by Letters Patent is:—

1. The process for the manufacture of refined lamp-black which comprises effecting the thermal decomposition in the absence of air of a hydrocarbon which gives rise under such conditions to objectionable volatile decomposition products, and collecting the finely divided liberated carbon outside the sphere of decomposition in a separate chamber maintained at a temperature sufficiently high to prevent deposition upon the carbon of condensable impurities.

2. The process for the manufacture of refined lampblack which comprises effecting the thermal decomposition in the absence of air of a hydrocarbon which gives rise under such conditions to objectionable volatile decomposition products, and collecting the finely-divided liberated carbon outside the sphere of decomposition at a temperature sufficiently high to prevent deposition upon the carbon of condensable impurities, and passing a current of innocuous gas over the hot carbon.

3. The process for the manufacture of refined lampblack which comprises cracking in the absence of air at a temperature between 500–700° C. a hydrocarbon which gives rise under such conditions to objectionable volatile or decomposition products, and collecting the finely-divided liberated carbon outside the sphere of decomposition at a temperature sufficiently high to prevent deposition upon the carbon of condensable impurities.

4. The process for the manufacture of refined lampblack which comprises cracking in the absence of air at a temperature between 500–700° C. a hydrocarbon which gives rise under such conditions to objectionable volatile decomposition products, and collecting the finely-divided liberated carbon outside the sphere of decomposition at a temperature of substantially 400° C.

5. The process for the manufacture of refined lampblack which comprises cracking in the absence of air at a temperature between 500–700° C. a hydrocarbon which gives rise under such conditions to objectionable volatile decomposition products and collecting the finely-divided liberated carbon outside the sphere of decomposition at a temperature of about 400° C. and passing a current of innocuous gas over the hot carbon.

In testimony whereof I affix my signature.

JNO. NELSON.